(12) United States Patent
You et al.

(10) Patent No.: US 6,783,813 B2
(45) Date of Patent: Aug. 31, 2004

(54) TONER COMPOSITION FOR ORGANIC BLACK MATRIX AND PREPARATION METHOD THEREOF

(75) Inventors: Jae-Sung You, Gunpo-si (KR); Kang-Suk Kim, Suwon-si (KR); Tae-Joo Lee, Seoul (KR)

(73) Assignee: Femtech Co., Ltd., Gyeonggi-do (KR)

( * ) Notice: Subject to any disclaimer, the term of this patent is extended or adjusted under 35 U.S.C. 154(b) by 128 days.

(21) Appl. No.: 10/107,086

(22) Filed: Mar. 25, 2002

(65) Prior Publication Data

US 2002/0187412 A1 Dec. 12, 2002

(30) Foreign Application Priority Data

Mar. 24, 2001 (KR) ................................ 10-2001-0015449

(51) Int. Cl.⁷ .......................... B32B 17/10; B32B 27/20
(52) U.S. Cl. .................. 428/1.1; 428/423.1; 428/425.6; 428/441; 428/500
(58) Field of Search .................. 524/317, 360, 524/376, 386; 428/1.1, 423.1, 425.6, 441, 500

(56) References Cited

U.S. PATENT DOCUMENTS 5,780,201 A * 7/1998 Sabnis et al. ............ 430/270.1
5,985,987 A * 11/1999 Adolfsson et al. .......... 524/593

FOREIGN PATENT DOCUMENTS

JP         02084471 A  *  3/1990  ........... C09D/11/10

OTHER PUBLICATIONS

SOLSPERSE Hyperdispersants for Solvent Based Packaging Inks designated SOL 009/97 and 28964/2/97, 4 pages.*
"SOLSPERSE Hyperdispersants for Solvent–Based Automotive Paints" designated SOL 003/98 and 289511/9/98, 10 pages.*
USPTO translation of JP 2/84471 (Mar. 26, 1990) Hiroshi Inoue.*
Derwent abstract, ACC–NO 1990–136154, of JP02084471 (0991.03.26), Hiroshi Inoue.*

* cited by examiner

Primary Examiner—Matthew A. Thexton
(74) Attorney, Agent, or Firm—Baker Botts L.L.P.

(57) ABSTRACT

Disclosed is a toner composition for an inorganic black matrix used for a color filter that is an important part of TFT-LCD by dispersing the fine particles of an inorganic pigment such as carbon black powder in a block copolymer solution having a high molecular weight and containing a pigment affinity group, and a preparation method thereof. It is the recent trend of the worldwide market to use a toner composition prepared by the pigment dispersion method in the manufacture of the organic black matrix. Thus the present invention provides a toner composition necessary to the manufacture of an organic black matrix and its preparation method using the pigment dispersion method, which involves mixing a block copolymer solution having a high molecular weight and containing a specific pigment affinity group, a inorganic pigment having electrical properties such as conductivity and optical density, a solvent and a dispersion adjuvant and applying optimized dispersion-mixing and dispersion equipment.

18 Claims, No Drawings

TONER COMPOSITION FOR ORGANIC BLACK MATRIX AND PREPARATION METHOD THEREOF

RELATED APPLICATIONS

This application claims priority to Korean Application No. 10-2001-0015449 filed Mar. 24, 2001 entitled Toner Composition for Organic Black matrix and Preparation Method Thereof.

BACKGROUND OF THE INVENTION

1. Field of the Invention

The present invention relates to a toner composition for an organic black matrix and a preparation method thereof for realizing color pixels of a liquid crystal display device.

More particularly, the present invention relates to the use of a toner composition, prepared by mixing a block copolymer resin having a high molecular weight and containing a pigment affinity group such as a hydroxyl group, a carboxyl group or an amine group and carbon black as a medium with a solvent and a dispersion adjuvant, in the manufacture of an organic black matrix as a component of the color filter of LCD, thereby enhancing the electrical properties, color and chemical resistance of the organic black matrix.

2. Background of the Related Art

Generally, the substrate of a color filter is manufactured by a known method including dyeing, pigment dispersion or electrodeposition. In particular, the black matrix is usually fabricated by the pigment dispersion method.

The pigment dispersion method is a method of manufacturing a color filter that repeatedly comprises the steps of coating a photosynthetic composition containing a colorant on a transparent substrate of the black matrix, performing an exposure of a desired pattern, removing the unexposed portions with a solvent, and performing a heat curing. The pigment dispersion method, which enhances the most important characteristics of the color filter, i.e. heat resistance and durability and maintains the thickness of the film uniform, is most widely used in the preparation of the black matrix. For example, Japanese patent publication No. 63-309916, Japanese patent publication No. 1-152449 and Korean patent publication No. 95-3135 disclose the preparation methods of black matrix using pigment dispersion. The black matrix prepared by the pigment dispersion method is largely composed of a polymer, i.e. a binder resin for supporting the black matrix and maintaining the thickness of the black matrix uniform, and a photopolymerizing monomer reactive to light during the exposure to form a photoresist phase. The black matrix may additionally comprise a photosensitive resin composition including pigment, polymerization initiator, epoxy resin, solvent, and other additives.

Solid fine particles such as pigments represented by carbon black, magnetic powder or ceramic powder are preferably not used alone but in combination with various compositions of different concentrations in order to provide various functions of coloring, reinforcement, tamping or chemical resistance.

Until now, there has been known a method using chrome monolayer, chrome/chrome oxide bilayer, organic matrix, graphite or manganese dioxide as the material of the black matrix. The most general material of the black matrix is sputtered chrome rather than spin-coated organic polymers. In spite of vacuum evaporization or other coating techniques for nickel and aluminum or even chrome, the sputtered chrome is still the most popular material of the black matrix. However, these techniques and materials do not meet the requirements for properties such as resistivity and optical density (O.D.) in the range of thickness less than 1 $\mu$m and therefore have limitations in their usage.

Dispersing equipment used in the pigment dispersion method may be those using a medium (e.g., glass beads or zirconium beads), such as 3-roll mill, sand mill, eiger mill, spike mill, dyno mill, Boa mill. Pigment dispersion with a ball mill or the like has difficulty in uniformly coating the whole surface of the solid fine particles with a polymer graft at a low mixing ratio of the reactive polymer to the solid fine particles, in which case the resulting surface-modified particles have a low content of the solid fine particles only to reduce the necessary characteristics of the solid fine particles. The above-mentioned dispersion methods have been used in the preparation of paints, inks or plastics and caused problems such as metal powder, bead abrasion and external contamination.

It has been considered that the organic black matrix having an O.D. of greater than 2.0 is almost impossible to prepare with the thickness of the superthin black matrix (less than 1 $\mu$m). With the progress of carbon black processing and dispersion techniques, a dispersing resin, a solvent and an additive are admixed under optimized dispersion conditions and the mixture is dispersed with dispersion facilities using a completely opposing impact method in the center of the dispersion chamber under a high pressure condition rather than by a conventional dispersion system using a medium such as glass bead or zirconium bead. This new method allows dispersion of the pigment to the primary particle size of the carbon black, that is, the particle size of the pigment basically formed in the preparation of the pigment, thereby increasing the O.D. value, enhancing storability and reducing the problematic contamination of the material of the electronic parts using the conventional medium dispersion system.

Though the dispersion method based on the Brownian motion through the medium such as glass bead or zirconium bead is the most popular method used in the related art, it has difficulty in preparing a toner composition having a superthin (less than 1 $\mu$m) organic black matrix with a O.D. of greater than 2.0 and causes contaminations due to the abrasion of the chamber. Thus there is a need for a novel dispersion method.

SUMMARY OF THE INVENTION

Accordingly, the present invention is directed to a toner composition for an organic black matrix and a preparation method thereof that substantially obviates one or more problems due to limitations and disadvantages of the related art.

An object of the present invention is to provide an environment-friendly toner composition for an organic black matrix of a color filter that is stable in storage and superior to the conventional toner composition in light resistance, color permeability, particle size distribution, coatability and pattern uniformity, and a preparation method thereof.

Another object of the present invention is to provide a novel dispersion method for preparing an organic black matrix of a color filter by dispersing the toner composition onto a substrate under high pressure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

DETAILED DESCRIPTION OF THE PREFERRED EMBODIMENT

To achieve these objects and other advantages and in accordance with the purpose of the invention, as embodied and broadly described herein, a toner composition of the present invention comprises 10 to 40 wt. % of an inorganic pigment, 15 to 35 wt. % of a copolymer solution having a high molecular weight and containing a pigment affinity group such as a hydroxyl group, a carboxyl group or amine group, 30 to 50 wt. % of a solvent, and 2 to 5 wt. % of a dispersion adjuvant. More preferably, the toner composition comprises 20 to 30 wt. % of an inorganic pigment, 20 to 30 wt. % of a copolymer solution having a high molecular weight and containing a pigment affinity group, 35 to 45 wt. % of a solvent, and 3 to 5 wt. % of a dispersion adjuvant, the said pigment affinity group containing a hydroxyl group, a carboxyl group or an amine group.

The inorganic pigment includes powder or particles of carbon black, alumina, titanium dioxide, barium titanate, magnesium titanate, calcium titanate; strontium titanate, zinc oxide, silica sand, clay, mica, wollastonite, siliceous earth, various inorganic oxidized pigments, chrome oxide, cerium oxide, Bengara, antimony trioxide, magnesium oxide, zirconium oxide, barium sulfate, barium carbonate, calcium carbonate, silica fine particles, silicon carbide, silicon nitride, boron carbide, tungsten carbide, or titanium carbide.

More preferably, the inorganic pigment includes carbon black, the specific examples of which may include REGAL 250R, REGAL 99R or ELFTEX 12 (commercially available from CABOT Company, U.S.A.); or RAVEN 880 ULTRA, RAVEN 860 ULTRA, RAVEN 850, RAVEN 790 ULTRA, RAVEN 760 ULTRA, RAVEN 520, RAVEN 500, RAVEN 460 or RAVEN 450 (commercially available from COLUMBIAN CHEMICALS Company, U.S.A.).

The particle size of the pigment used in the preparation of the carbon black toner composition is preferably less than 100 nm, more preferably less than 80 nm. The particles of the pigment may be processed into an inorganic layer so as to improve the stability of the dispersed material. Preferably, the carbon black has a primary particle size of 30 to 80 nm and an oil absorption (DBP) of 50 to 80 ml/100 g. The average particle size distribution of the toner composition for an organic black matrix is 50 to 80 nm.

The copolymer solution having a high molecular weight and containing a pigment affinity group preferably contains acryl copolymer, acrylic modified urethane, or polyester modified urethane. Specific examples of the copolymer solution may include DISPERBYK-2000, DISPERBYK-2001, DISPERBYK-168, DISPERBYK-170, DISPERBYK-171, DISPERBYK-172 or DISPERBYK-140 (commercially available from BYK Company, Germany); or SOLSPERSE-20000, SOLSPERSE-24000, SOLSPERSE-32500, SOLSPERSE-32550, SOLSPERSE-38500 or SOLSPERSE-31845 (commercially available from AVECIA Company, U.K.), which are all used as a dispersing resin effective for the Newtonian dispersion of the pigment.

Preferably, the dispersion adjuvant is a synergist that enhances the fluidity of the toner composition and maximizes the dispersion effect. Specific example of the dispersion adjuvant may include SOLSPERSE-5000, SOLSPERSE-22000 or SOLSPERSE-12000 (commercially available from AVECIA company, U.K.).

The solvent is preferably an organic solvent highly compatible with the photosensitive resin used for the organic black matrix as well as with the copolymer solution and the dispersion adjuvant. Specific examples of the solvent may include propylene glycol monomethyl ether acetate (PGMEA), ethyl 3-ethoxypropionate (EEP), ethylene glycol, ethylene glycol acetate, ethyl cellosolve, propylene glycol methyl ether acetate, diethylene glycol, cyclohexanone, and propylene glycol methyl ether. These solvents are used alone or in combination thereof. More particularly, the solvent used may be PGMEA or EEP.

The content of the solvent used in the present invention may vary depending on the photosensitive resin composition, and is preferably determined to have such a viscosity as to make the resin solution coatable on the substrate. The content of the solvent is, based on the total weight of the photosensitive resin composition, 20 to 80 wt. %, preferably 50 to 60 wt. %.

The preparation method of the toner composition of the present invention is as follows. First, based on the total weight of the toner composition, 30 to 50 wt. %, preferably 35 to 45 wt. % of a solvent is added to a container and stirred at a low speed of 500 to 1800 rpm for 2 to 20 minutes(step 1). Then 15 to 35 wt. %, preferably 20 to 30 wt. % of a copolymer solution having a high molecular weight and containing a pigment affinity group such as a hydroxyl group, a carboxyl group or an amine group is added to the mixture of the step 1. Subsequently, 2 to 5 wt. %, preferably 3 to 5 wt. % of a dispersion adjuvant is added and the resulting mixture is stirred at a low speed of 500 to 1800 rpm for 5 to 20 minutes(step 2). After adding 10 to 40 wt. %, preferably 20 to 30 wt. % of an inorganic pigment while stirring the mixture of the step 2, the resulting mixture is stirred at a high speed of 2000 to 4000 rpm for 10 to 50 minutes to yield the toner composition of the present invention.

The most common dispersion equipment is a mixing disperser using a medium such as glass bead or zirconium bead. But because the toner composition of the present invention is used as a material for electronic parts, the dispersion equipment as used herein is based on the dispersion method using a high pressure that reduces contamination of the medium-based dispersion system and disperses the pigment to the primary particle size.

The dispersion equipment as used herein is designed to have a different mechanism from the conventional 3-roll mill, emulsifying machine or milling machine and can be used for preparation of ultrafine particles in the level of $1/100$ μm. The dispersion system of the present invention is a wet dispersion system that applies high-pressure (1000 to 3500 kgf/cm$^2$) to the dispersed material, divides the dispersed material into two streams and at the point where the two streams meet, the dispersed material is under opposing impact for grinding to ultrafine particles, emulsification and dispersion.

The above-stated dispersion method overcomes the problem with the conventional dispersion system in regard to abrasion of metal powder and bead and external introduction of contaminants, shortens the processing time and enhances the quality of the products.

Hereinafter, the present invention will be described in detail by way of the following examples, which are not intended to limit the scope of the present invention.

EXAMPLE 1

20 g of propylene glycol monomethyl ether acetate (PGMEA) and 20 g of ethyl 3-ethoxypropionate (EEP) were added to a SUS container and stirred with a mixing stirrer at a low speed of 1000 to 1500 rpm for 5 minutes. While stirring the mixture, 27 g of SOLSPERSE 24000 and then 3 g of SOLSPERSE 5000 were added to the mixture and stirred at a low speed of 1000 to 1500 rpm for 10 minutes. 30 g of RAVEN 860 ULTRA was added and the mixture was then stirred at a high speed of 2000 to 2500 rpm for 30 minutes. After the completion of the stirring, the mixture was pass-dispersed with a high-pressure mill with a pressure of 1000 to 3500 kgf/cm$^2$ for one to five times. The average particle size and the viscosity of the product were determined as follows.

As used herein, the pass-dispersion means introducing the material to the dispersing machine and discharging the dispersed material, and five times of the pass-dispersion refers to repeatedly performing the procedure five times. The average particle size was measured with a particle size analyzer (PSA) and the final viscosity was determined with a Brookfield viscometer at 25° C.

Pass-based average particle size: 99, 89, 85, 75, 69 nm.
Final viscosity: 120 cps (25° C.).

EXAMPLE 2

The procedures were performed in the same manner as described in Example 1, except that REGAL 250R was used instead of RAVEN 860 ULTRA. The average particle size and the viscosity of the product were as follows.

Pass-based average particle size: 145, 110, 98, 95, 88 nm.
Final viscosity (Brookfield viscometer): 160 cps (25° C.).

EXAMPLE 3

The procedures were performed in the same manner as described in Example 1, except that REGAL 99R was used instead of RAVEN 860 ULTRA. The average particle size and the viscosity of the product were as follows.

Pass-based average particle size: 167, 142, 115, 108, 98 nm.
Final viscosity (Brookfield viscometer): 160 cps (25° C.).

EXAMPLE 4

The procedures were performed in the same manner as described in Example 1, except that ELFTEX 12 was used instead of RAVEN 860 ULTRA. The average particle size and the viscosity of the product were as follows.

Pass-based average particle size: 105, 94, 89, 75, 71 nm.
Final viscosity (Brookfield viscometer): 130 cps (25° C.).

EXAMPLE 5

20 g of PGMEA and 20 g of EEP were added to a SUS container and stirred with a mixing stirrer at a low speed of 1000 to 1500 rpm for 5 minutes. While stirring the mixture, 27 g of SOLSPERSE 20000 and then 3 g of SOLSPERSE 5000 were added to the mixture and stirred at a low speed of 1000 to 1500 rpm for 10 minutes. 30 g of RAVEN 860 ULTRA was added and the mixture was then stirred at a high speed of 2000 to 2500 rpm for 30 minutes. After the completion of the stirring, the mixture was pass-dispersed with a high-pressure mill with a pressure of 1000 to 3500 kgf/cm$^2$ for one to five times. The average particle size and the viscosity of the product were determined as follows.

Pass-based average particle size: 95, 87, 83, 75, 65 nm.
Final viscosity (Brookfield viscometer): 110 cps (25° C.).

EXAMPLE 6

The procedures were performed in the same manner as described in Example 5, except that REGAL 250R was used instead of RAVEN 860 ULTRA. The average particle size and the viscosity of the product were as follows.

Pass-based average particle size: 141, 106, 93, 85, 81 nm.
Final viscosity (Brookfield viscometer): 150 cps (25° C.).

EXAMPLE 7

The procedures were performed in the same manner as described in Example 5, except that REGAL 99R was used instead of RAVEN 860 ULTRA. The average particle size and the viscosity of the product were as follows.

Pass-based average particle size: 160, 139, 115, 101, 92 nm.
Final viscosity (Brookfield viscometer): 150 cps (25° C.).

EXAMPLE 8

The procedures were performed in the same manner as described in Example 5, except that ELFTEX 12 was used instead of RAVEN 860 ULTRA. The average particle size and the viscosity of the product were as follows.

Pass-based average particle size: 98, 91, 85, 72, 65 nm.
Final viscosity: 110 cps: (25° C.)

EXAMPLE 9

20 g of PGMEA and 20 g of EEP were added to a SUS container and stirred with a mixing stirrer at a low speed of 1000 to 1500 rpm for 5 minutes. While stirring the mixture, 27 g of SOLSPERSE 32500 and then 3 g of SOLSPERSE 5000 were added to the mixture and stirred at a low speed of 1000 to 1500 rpm for 10 minutes. 30 g of RAVEN 860 ULTRA was added and the mixture was then stirred at a high speed of 2000 to 2500 rpm for 30 minutes. After the completion of the stirring, the mixture was pass-dispersed with a high-pressure mill with a pressure of 1000 to 3500 kgf/cm$^2$ for one to five times. The average particle size and the viscosity of the product were determined as follows.

Pass-based average particle size: 109, 98, 86, 78, 70 nm.
Final viscosity (Brookfield viscometer): 120 cps (25° C.).

EXAMPLE 10

The procedures were performed in the same manner as described in Example 9, except that REGAL 250R was used instead of RAVEN 860 ULTRA. The average particle size and the viscosity of the product were as follows.

Pass-based average particle size: 147, 115, 103, 95, 87 nm.
Final viscosity (Brookfield viscometer): 160 cps (25° C.).

EXAMPLE 11

The procedures were performed in the same manner as described in Example 9, except that REGAL 99R was used instead of RAVEN 860 ULTRA. The average particle size and the viscosity of the product were as follows.

Pass-based average particle size: 170, 145, 119, 108, 98 nm.
Final viscosity (Brookfield viscometer): 160 cps (25° C.).

EXAMPLE 12

The procedures were performed in the same manner as described in Example 9, except that ELFTEX 12 was used instead of RAVEN 860 ULTRA. The average particle size and the viscosity of the product were as follows.

Pass-based average particle size: 110, 97, 90, 82, 74 nm.

Final viscosity: 120 cps (25° C.).

EXAMPLE 13

20 g of PGMEA and 20 g of EEP were added to a SUS container and stirred with a mixing stirrer at a low speed of 1000 to 1500 rpm for 5 minutes. While stirring the mixture, 27 g of DISPERBYK-170 and then 3 g of SOLSPERSE 5000 were added to the mixture and stirred at a low speed of 1000 to 1500 rpm for 10 minutes. 30 g of RAVEN 860 ULTRA was added and the mixture was then stirred at a high speed of 2000 to 2500 rpm for 30 minutes. After the completion of the stirring, the mixture was pass-dispersed with a high-pressure mill with a pressure of 1000 to 3500 kgf/cm$^2$ for one to five times. The average particle size and the viscosity of the product were determined as follows.

Pass-based average particle size: 103, 95, 86, 79, 71 nm.

Final viscosity (Brookfield viscometer): 130 cps (25° C.).

EXAMPLE 14

The procedures were performed in the same manner as described in Example 13, except that REGAL 250R was used instead of RAVEN 860 ULTRA. The average particle size and the viscosity of the product were as follows.

Pass-based average particle size: 149, 117, 105, 98, 89 nm.

Final viscosity (Brookfield viscometer): 170 cps (25° C.).

EXAMPLE 15

The procedures were performed in the same manner as described in Example 13, except that REGAL 99R was used instead of RAVEN 860 ULTRA. The average particle size and the viscosity of the product were as follows.

Pass-based average particle size: 178, 152, 125, 115, 103 nm.

Final viscosity (Brookfield viscometer): 180 cps (25° C.).

EXAMPLE 16

The procedures were performed in the same manner as described in Example 13, except that ELFTEX 12 was used instead of RAVEN 860 ULTRA. The average particle size and the viscosity of the product were as follows.

Pass-based average particle size: 111, 104, 96, 87, 76 nm.

Final viscosity: 130 cps (25° C.)

EXAMPLE 17

The individual color toners thus prepared were analyzed in regard to various properties by the test methods specified as follows. The results are presented in Table 1.

(1) Test of Particle Size Distribution 3 ml of the toner composition was added to a particle size analyzer (PSA) and analyzed in regard to average particle size and distribution (measured after five times of pass-dispersion).

⊚: 50~100 nm

○: 100~150 nm

Δ: 150~200 nm

X: greater than 200 nm (2) Test of Dispersability

The degree of pass-based distribution with a high-pressure mill for dispersion of the dispersed material under opposing impact under a high pressure (1000 to 3500 kfg/cm$^2$) was measured.

⊚: 50~100 nm in one time or pass-dispersion

○: 50~100 nm in two or three times of pass-dispersion

Δ: 50~100 nm in four or five times of pass-dispersion

X: 50~100 nm in six or more times of pass-dispersion (3) Test of Storage Stability For the toner compositions thus prepared, the viscosity was first measured with a Brookfield viscometer at 25° C. After storage at 60° C. for 120 hours, the toner compositions were measured again in regard to the viscosity. Then the recoagulation and the difference in the viscosity were evaluated using the difference between the first and second viscosity measurements.

⊚: less than 20% difference in particle size and viscosity

○: less than 40% difference in particle size and viscosity

Δ: less than 60% difference in particle size and viscosity

X: greater than 60% difference in particle size and viscosity (4) Measurement of Optical Density (O.D.)

The photosensitive resin for a black matrix was mixed with the color toner composition at a mixing weight ratio of 60:40. The mixture was spin-coated on an indium tin oxide (ITO) substrate for LCD to have a dry film thickness of 1 μm and measured in regard to the O.D. value.

⊚: greater than 2.5

○: 2.2~2.5

Δ: 2.0~2.2

X: less than 2.0

TABLE 1

| Test Item Sample No. | Particle Size Distribution | Dispersability | Storage Stability | O.D. |
|---|---|---|---|---|
| Example 1 | ⊚ | ⊚ | ⊚ | ⊚ |
| Example 2 | ⊚ | ○ | ○ | ○ |
| Example 3 | ⊚ | Δ | ○ | X |
| Example 4 | ⊚ | ○ | ○ | ○ |
| Example 5 | ⊚ | ⊚ | ⊚ | ⊚ |
| Example 6 | ⊚ | ○ | ⊚ | ○ |
| Example 7 | ⊚ | Δ | ⊚ | X |
| Example 8 | ⊚ | ⊚ | ⊚ | ○ |
| Example 9 | ⊚ | ○ | ○ | ⊚ |
| Example 10 | ⊚ | Δ | Δ | ○ |
| Example 11 | ⊚ | Δ | Δ | X |
| Example 12 | ⊚ | ○ | Δ | ○ |
| Example 13 | ⊚ | ○ | ○ | ⊚ |
| Example 14 | ⊚ | Δ | ○ | ○ |
| Example 15 | ⊚ | X | ○ | X |
| Example 16 | ⊚ | ○ | ○ | ⊚ |

The foregoing embodiments are merely exemplary and are not to be construed as limiting the -present invention. The present teachings can be readily applied to other types of apparatuses. The description of the present invention is intended to be illustrative, and not to limit, the scope of the claims. Many alternatives, modifications, and variations will be apparent to those skilled in the art.

REGAL and ELFTEX are registered trademarks of Cabot Company, USA.

RAVEN and ULTRA are registered trademarks of Columbian Chemicals Company, USA.

DISPERBYK is a registered trademark of BYK-Chemie, Germany.

SOLSPERSE is a registered trademark of Avecia Limited, UK.

What is claimed is:

1. A coated material, comprising:

a color filter photoresist;

a toner composition applied to the color filter photoresist, the toner composition comprising 10 to 40 wt. % of an inorganic pigment, 15 to 35 wt. % of a copolymer having a pigment affinity group comprising acryl polymer, acrylic modified urethane or polyester modified urethane, 30 to 50 wt. % of a solvent and 2 to 5 wt. % of a dispersion adjuvant.

2. The coated material of claim 1, wherein the toner composition comprises 20 to 30 wt. % of an inorganic pigment, 20 to 30 wt. % of a copolymer having a pigment affinity group comprising acryl polymer, acrylic modified urethane or polyester modified urethane, 35 to 45 wt. % of a solvent and 3 to 5 wt. % of a dispersion adjuvant.

3. The coated material of claim 1 wherein the inorganic pigment comprises powder or particles of carbon black, alumina, titanium dioxide, barium titanate, magnesium titanate, calcium titanate, strontium titanate, zinc oxide, silica sand, clay, mica, wollastonite, siliceous earth, various inorganic oxidized pigments, chrome oxide, cerium oxide, Bengara, antimony trioxide, magnesium oxide, zirconium oxide, barium sulfate, barium carbonate, calcium carbonate, silica fine particles, silicon carbide, silicon nitride, boron carbide, tungsten carbide or titanium carbide.

4. The coated material of claim 3 wherein the carbon black comprises a brand of industrial carbon black.

5. The coated material of claim 3 wherein the carbon black has a primary particle size of 30 to 80 nm.

6. The coated material of claim 1 wherein the copolymer comprises a brand of industrial copolymer.

7. The coated material of claim 1 wherein the dispersion adjuvant comprises a synergist to enhance the fluidity of the toner composition and maximize the dispersion effect.

8. The coated material of claim 7 wherein the dispersion adjuvant comprises a brand of industrial synergist.

9. The coated material of claim 1 wherein the solvent comprises propylene glycol monomethyl ether acetate (PGMEA) ethyl 3-ethoxypropionate (EEP), ethylene glycol, ethylene glycol acetate, ethyl cellosolve, propylene glycol methyl ether acetate, diethylene glycol, cyclohexanone or propylene glycol methyl ether, which are used alone or in combination thereof.

10. An organic black matrix, comprising:

a substrate having a toner composition thereon, the toner composition comprising 10 to 40 wt. % of an inorganic pigment, 15 to 35 wt. % of a copolymer having a pigment affinity group comprising acryl polymer, acrylic modified urethane or polyester modified urethane, 30 to 50 wt. % of a solvent and 2 to 5 wt. % of a dispersion adjuvant.

11. The organic black matrix of claim 10, wherein the toner composition comprises 20 to 30 wt. % of an inorganic pigment, 20 to 30 wt. % of a copolymer having a pigment affinity group comprising acryl polymer, acrylic modified urethane or polyester modified urethane, 35 to 45 wt. % of a solvent and 3 to 5 wt. % of a dispersion adjuvant.

12. The organic black matrix of claim 10 wherein the inorganic pigment comprises powder or particles of carbon black, alumina, titanium dioxide, barium titanate, magnesium titanate, calcium titanate, strontium titanate, zinc oxide, silica sand, clay, mica, wollastonite, siliceous earth, various inorganic oxidized pigments, chrome oxide, cerium oxide, Bengara, antimony trioxide, magnesium oxide, zirconium oxide, barium sulfate, barium carbonate, calcium carbonate, silica fine particles, silicon carbide, silicon nitride, boron carbide, tungsten carbide or titanium carbide.

13. The organic black matrix of claim 12 wherein the carbon black comprises a brand of industrial carbon black.

14. The organic black matrix of claim 12 wherein the carbon black has a primary particle size of 30 to 80 nm.

15. The organic black matrix of claim 10 wherein the copolymer comprises a brand of industrial copolymer.

16. The organic black matrix of claim 10 wherein the dispersion adjuvant comprises a synergist to enhance the fluidity of the toner composition and maximize the dispersion effect.

17. The organic black matrix of claim 16 wherein the dispersion adjuvant comprises a brand of industrial synergist.

18. The organic black matrix of claim 10 wherein the solvent comprises propylene glycol monomethyl ether acetate (PGMEA) ethyl 3-ethoxypropionate (EEP), ethylene glycol, ethylene glycol acetate, ethyl cellosolve, propylene glycol methyl ether acetate, diethylene glycol, cyclohexanone or propylene glycol methyl ether, which are used alone or in combination thereof.

* * * * *